(12) United States Patent
Zhang

(10) Patent No.: US 12,365,495 B2
(45) Date of Patent: Jul. 22, 2025

(54) TRAJECTORY TRACKING METHOD AND UNMANNED AERIAL VEHICLE

(71) Applicant: AUTEL ROBOTICS CO., LTD., Guangdong (CN)

(72) Inventor: Tianbao Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 260 days.

(21) Appl. No.: 18/085,818

(22) Filed: Dec. 21, 2022

(65) Prior Publication Data

US 2023/0127974 A1   Apr. 27, 2023

Related U.S. Application Data

(63) Continuation of application No. PCT/CN2021/101520, filed on Jun. 22, 2021.

(30) Foreign Application Priority Data

Jun. 24, 2020   (CN) .......................... 202010592286.2

(51) Int. Cl.
*B64U 20/87*   (2023.01)
(52) U.S. Cl.
CPC .......... *B64U 20/87* (2023.01); *B64U 2201/00* (2023.01)
(58) Field of Classification Search
None
See application file for complete search history.

(56) References Cited

U.S. PATENT DOCUMENTS

| 9,442,485 B1 | 9/2016 | McDermott et al. |
| 2017/0010611 A1* | 1/2017 | Tao ........................ G09B 19/165 |

(Continued)

FOREIGN PATENT DOCUMENTS

| CN | 105068542 A | 11/2015 |
| CN | 105468014 A | 4/2016 |

(Continued)

OTHER PUBLICATIONS

C. E. Lin and S.-K. Yang, "Camera gimbal tracking from UAV flight control," 2014 CACS International Automatic Control Conference (CACS 2014), Kaohsiung, Taiwan, 2014, pp. 319-322, doi: 10.1109/CACS.2014.7097209. (Year: 2014).*

(Continued)

*Primary Examiner* — Jelani A Smith
*Assistant Examiner* — Davin Seol

(57) ABSTRACT

Embodiments of the present invention are a trajectory tracking method and an unmanned aerial vehicle. The method is including an unmanned aerial vehicle body and a gimbal, and the unmanned aerial vehicle body being equipped with at least one visual sensor, and the method includes: obtaining a flight image acquired by the at least one visual sensor, the flight image including a to-be-tracked target; performing visual image processing on the flight image, to generate a gimbal rotation instruction and a path instruction; adjusting an angle of the gimbal according to the gimbal rotation instruction and a gimbal state parameter of the gimbal, to lock the to-be-tracked target; and controlling a motor speed of a flight motor of the unmanned aerial vehicle according to the path instruction and a flight state parameter of the unmanned aerial vehicle, to cause the unmanned aerial vehicle to track the to-be-tracked target according to the path instruction.

14 Claims, 6 Drawing Sheets

(56) References Cited

U.S. PATENT DOCUMENTS

| | | | |
|---|---|---|---|
| 2017/0227162 A1* | 8/2017 | Saika | H04N 23/50 |
| 2018/0284815 A1* | 10/2018 | Cui | G05D 1/104 |
| 2019/0033892 A1* | 1/2019 | Gomez Gutierrez | B64U 10/14 |
| 2019/0324478 A1* | 10/2019 | Lin | G05D 1/085 |
| 2020/0104598 A1* | 4/2020 | Qian | G06V 20/20 |
| 2020/0143545 A1 | 5/2020 | Weng et al. | |
| 2020/0309523 A1* | 10/2020 | Liu | B64U 20/87 |
| 2020/0310542 A1* | 10/2020 | Su | G01P 15/08 |
| 2021/0120176 A1* | 4/2021 | Wang | H04N 23/687 |

FOREIGN PATENT DOCUMENTS

| | | | |
|---|---|---|---|
| CN | 105787447 A * | 7/2016 | G06K 9/00711 |
| CN | 105929850 A | 9/2016 | |
| CN | 106485736 A | 3/2017 | |
| CN | 108476288 A | 8/2018 | |
| CN | 108693892 A | 10/2018 | |
| CN | 108958289 A | 12/2018 | |
| CN | 109661631 A | 4/2019 | |
| CN | 111026160 A | 4/2020 | |
| CN | 111665870 A | 9/2020 | |

OTHER PUBLICATIONS

M. Sun, R. Zhu and X. Yang, "UAV Path Generation, Path Following and Gimbal Control," 2008 IEEE International Conference on Networking, Sensing and Control, Sanya, China, 2008, pp. 870-873, doi: 10.1109/ICNSC.2008.4525338. (Year: 2008).*

The International Search Report mailed Sep. 7, 2021; PCT/CN2021/101520 with English Translation.

"Modeling and control for tracking ground target using an unmanned air vehicle" written by Xin Zhekui etc.; 6 pages, Apr. 19, 2009 (English abstract at end of publication).

* cited by examiner

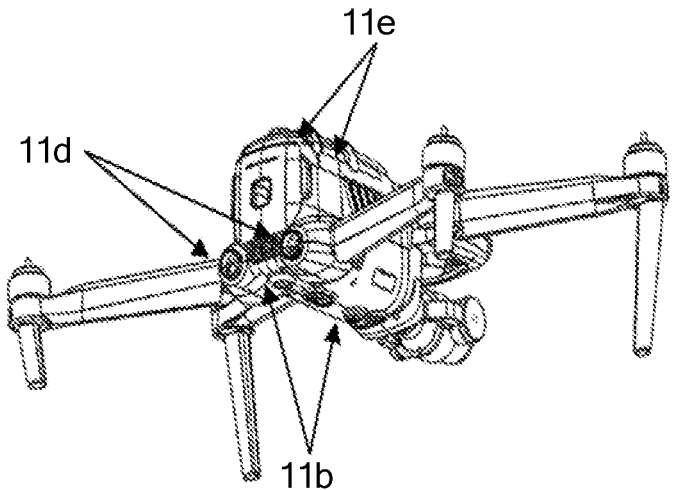

FIG. 2b

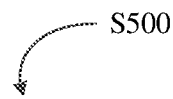

| | S51 |
|---|---|
| Obtain a flight image acquired by the at least one visual sensor, the flight image including a to-be-tracked target | |

| | S52 |
|---|---|
| Perform visual image processing on the flight image, to generate a gimbal rotation instruction and a path instruction | |

| | S53 |
|---|---|
| Adjust an angle of the gimbal according to the gimbal rotation instruction and a gimbal state parameter of the gimbal, to lock the to-be-tracked target | |

| | S54 |
|---|---|
| Control a motor speed of a flight motor of the unmanned aerial vehicle according to the path instruction and a flight state parameter of the unmanned aerial vehicle, to cause the unmanned aerial vehicle to track the to-be-tracked target according to the path instruction | |

FIG. 3

TRAJECTORY TRACKING METHOD AND UNMANNED AERIAL VEHICLE

CROSS-REFERENCE TO RELATED APPLICATIONS

The present application is a continuation of International Application No. PCT/CN2021/101520, filed on Jun. 22, 2021, which claims priority to Chinese Patent Application No. 2020105922862, filed on Jun. 24, 2020, which is incorporated herein by reference in its entirety.

TECHNICAL FIELD

Embodiments of the present invention relate to the field of unmanned aerial vehicle technologies, and in particular, to a trajectory tracking method and an unmanned aerial vehicle.

BACKGROUND

With the rapid development of unmanned aerial vehicle technologies, unmanned aerial vehicles have been widely used to recognize and track moving targets. Currently, when an unmanned aerial vehicle is used to track a moving target, it is necessary to continuously perform path planning according to a position of the moving target, to avoid an obstacle while keeping tracking.

However, during implementation of the present invention, the inventor found that in the foregoing trajectory tracking method, path planning is performed only according to the position of the moving target, resulting in low tracking precision of the unmanned aerial vehicle, and degrading tracking performance of the unmanned aerial vehicle.

SUMMARY

In view of the foregoing problems, embodiments of the present invention provide a trajectory tracking method and an unmanned aerial vehicle, which can improve tracking performance of the unmanned aerial vehicle.

To resolve the foregoing technical problems, the embodiments of the present invention provide the following technical solutions:

According to an aspect of the embodiments of the present invention, a trajectory tracking method is provided, applied to an unmanned aerial vehicle including an unmanned aerial vehicle body and a gimbal, the gimbal being mounted on the unmanned aerial vehicle body, and the unmanned aerial vehicle body being equipped with at least one visual sensor, where the method includes:

obtaining a flight image acquired by the at least one visual sensor, the flight image including a to-be-tracked target;

performing visual image processing on the flight image, to generate a gimbal rotation instruction and a path instruction;

adjusting an angle of the gimbal according to the gimbal rotation instruction and a gimbal state parameter of the gimbal, to lock the to-be-tracked target; and controlling a motor speed of a flight motor of the unmanned aerial vehicle according to the path instruction and a flight state parameter of the unmanned aerial vehicle, to cause the unmanned aerial vehicle to track the to-be-tracked target according to the path instruction.

In some embodiments, the unmanned aerial vehicle body includes a fuselage, and the visual sensor includes binocular sensors; and the binocular sensors are 6 in number, and are respectively arranged on the top, bottom, left, right, front and rear of the fuselage.

In some embodiments, the gimbal rotation instruction includes a yaw angle instruction, a pitch angle instruction, a yaw angle rotational velocity instruction and a pitch angle rotational velocity instruction; and the gimbal state parameter includes a gimbal attitude angle and a rotational angular rate.

In some embodiments, the adjusting an angle of the gimbal according to the gimbal rotation instruction and a gimbal state parameter of the gimbal includes:

generating an angular velocity reference expected value according to the yaw angle instruction, the pitch angle instruction, the yaw angle rotational velocity instruction, the pitch angle rotational velocity instruction and the gimbal attitude angle;

generating an angular acceleration instruction according to the yaw angle rotational velocity instruction and the pitch angle rotational velocity instruction; and adjusting the angle of the gimbal according to the angular velocity reference expected value, the angular acceleration instruction and the rotational angular rate.

In some embodiments, the adjusting the angle of the gimbal according to the angular velocity reference expected value, the angular acceleration instruction and the rotational angular rate includes:

generating a gimbal control instruction according to the angular velocity reference expected value, the angular acceleration instruction and the rotational angular rate; and adjusting the angle of the gimbal by using the gimbal control instruction.

In some embodiments, the path instruction includes a position instruction, a velocity instruction, an acceleration instruction, a jerk instruction, the yaw angle rotational velocity instruction and the yaw angle instruction; and the flight state parameter includes a position, a velocity, a heading angle, an unmanned aerial vehicle attitude angle and an angular velocity.

In some embodiments, the controlling a motor speed of a flight motor of the unmanned aerial vehicle according to the path instruction and a flight state parameter of the unmanned aerial vehicle includes:

generating a velocity reference expected value according to the position instruction, the velocity instruction and the position;

generating an acceleration reference expected value according to the velocity reference expected value, the acceleration instruction and the velocity;

obtaining an attitude angle reference expected value and a throttle value according to the heading angle;

calculating an angular rate instruction and an angular acceleration instruction according to the jerk instruction, the yaw angle rotational velocity instruction and the unmanned aerial vehicle attitude angle;

generating an attitude angular rate reference expected value according to the attitude angle reference expected value, the throttle value, the yaw angle instruction, the unmanned aerial vehicle attitude angle and the angular rate instruction;

generating a normalized torque control amount according to the attitude angular rate reference expected value, the angular velocity and the angular acceleration instruction; and controlling the motor speed of the flight motor of the unmanned aerial vehicle according to the normalized torque control amount and the throttle value.

In some embodiments, the obtaining an attitude angle reference expected value and a throttle value according to the heading angle includes:

generating a first rotation matrix according to the heading angle; and converting the acceleration reference expected value into the attitude angle reference expected value and the throttle value by using the first rotation matrix.

In some embodiments, the calculating an angular rate instruction and an angular acceleration instruction according to the jerk instruction, the yaw angle rotational velocity instruction and the unmanned aerial vehicle attitude angle includes:

generating a second rotation matrix according to the jerk instruction, the yaw angle rotational velocity instruction and the unmanned aerial vehicle attitude angle; and calculating the angular rate instruction and the angular acceleration instruction based on the second rotation matrix.

In some embodiments, the controlling the motor speed of the flight motor of the unmanned aerial vehicle according to the normalized torque control amount and the throttle value includes:

generating a flight control instruction according to the normalized torque control amount and the throttle value; and controlling the motor speed of the flight motor of the unmanned aerial vehicle by using the flight control instruction.

According to an aspect of the embodiments of the present invention, an unmanned aerial vehicle is provided, including:

an unmanned aerial vehicle body, being equipped with at least one visual sensor;

a gimbal, mounted on the unmanned aerial vehicle body;

a first sensing module, arranged on the gimbal and configured to obtain a gimbal state parameter of the gimbal;

a second sensing module, arranged on the unmanned aerial vehicle body and configured to obtain a flight state parameter of the unmanned aerial vehicle;

at least one processor; and a memory communicatively connected to the at least one processor, where the memory storing instructions executable by the at least one processor, the instructions being executed by the at least one processor, to cause the at least one processor to perform the trajectory tracking method according to any of the foregoing aspects.

According to an aspect of the embodiments of the present invention, a non-volatile computer-readable storage medium is provided, storing computer-executable instructions, the computer-executable instructions being used for enabling the unmanned aerial vehicle to perform the trajectory tracking method according to any of the foregoing aspects.

In the embodiments of the present invention, the angle of the gimbal is adjusted and the motor speed of the flight motor of the unmanned aerial vehicle is controlled according to the flight image acquired by the at least one visual sensor in real time, the gimbal state parameter of the gimbal and the flight state parameter of the unmanned aerial vehicle. The foregoing adjustment process is repeated. In this way, the unmanned aerial vehicle precisely tracks the to-be-tracked target according to a trajectory obtained by processing the flight image. The tracking performance of the unmanned aerial vehicle may be improved through cooperation of the at least one visual sensor, the gimbal and the flight motor of the unmanned aerial vehicle.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

FIG. 2b is a schematic structural diagram of another view of the unmanned aerial vehicle shown in FIG. 1.

FIG. 3 is a flowchart of a trajectory tracking method according to an embodiment of the present invention.

DETAILED DESCRIPTION

To make the objectives, technical solutions, and advantages of embodiments of the present invention clearer, the technical solutions in the embodiments of the present invention are clearly and completely described below with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It is to be noted that, although functional module division is performed in the schematic diagram of the apparatus, and a logical order is shown in the flowchart, in some cases, the shown or described steps may be performed by using module division different from the module division in the apparatus, or in an order different from the order in the flowchart. In addition, terms such as "first" and "second" are merely used for description and should not be understood as indicating or implying relative importance.

In addition, technical features involved in implementations of the present invention that are described below may be combined with each other as long as no conflict occurs.

Figure 1:
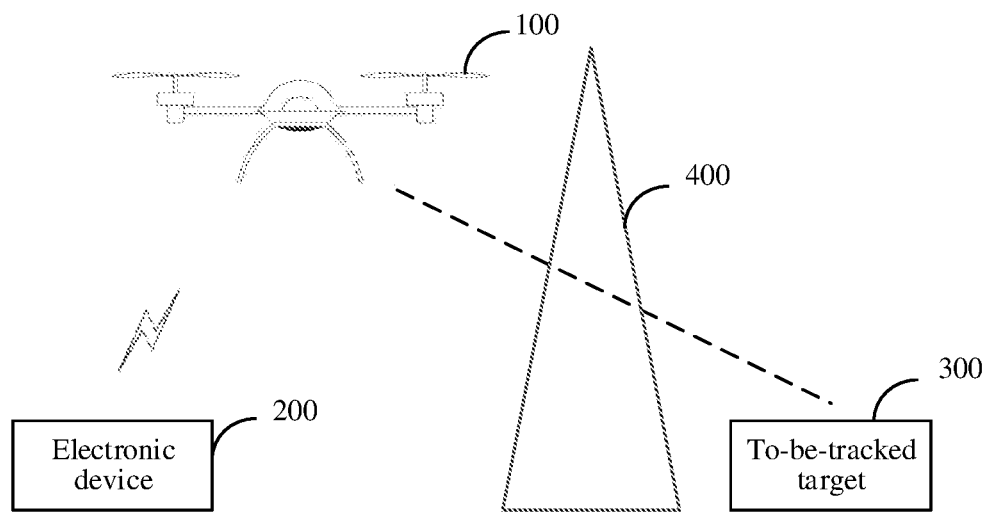
FIG. 1 is a diagram of an application scenario of a trajectory tracking method according to an embodiment of the present invention.

A trajectory tracking method and apparatus provided in the embodiments of the present invention may be applied to an application scenario shown in FIG. 1. As shown in FIG. 1, the application scenario includes an unmanned aerial vehicle 100 and a to-be-tracked target 300. The unmanned aerial vehicle 100 may be configured to track the to-be-tracked target 300. The unmanned aerial vehicle 100 may encounter an obstacle 400 when tracking the to-be-tracked target 300. The unmanned aerial vehicle 100 needs to avoid the obstacle 400 while tracking the to-be-tracked target 300, to achieve normal flight.

The unmanned aerial vehicle 100 may be a suitable unmanned aircraft, including a fixed-wing unmanned aircraft and a rotary-wing unmanned aircraft, for example, a helicopter, a quadcopter and an aircraft having another quantity of rotors and/or rotor configurations. The unmanned aerial vehicle 100 may alternatively be another movable object, for example, a manned aircraft, a model airplane, an unmanned airship, an unmanned hot air balloon and the like. The to-be-tracked target 300 may be any suitable movable or non-movable object, including vehicles, people, animals, buildings, mountains, rivers and the like. The obstacle 400 is, for example, a building, a mountain, a tree, a forest, a signal tower or another movable or non-movable object (where only one obstacle is shown in FIG. 1, and there may be more obstacles or no obstacle during actual application).

Figure 2A:
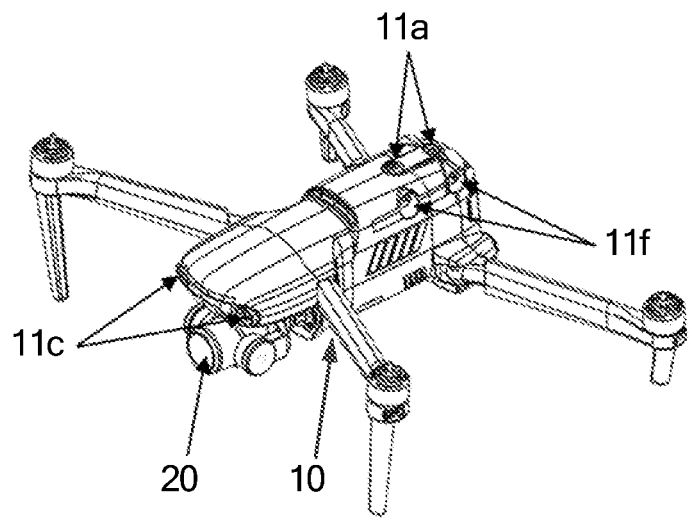
FIG. 2a is a schematic structural diagram of a view of the unmanned aerial vehicle shown in FIG. 1.

As shown in FIG. 2a and FIG. 2b, the unmanned aerial vehicle 100 includes an unmanned aerial vehicle body 10 and a gimbal 20. The gimbal 20 is mounted on the unmanned aerial vehicle body 10. The unmanned aerial vehicle body 10 is equipped with at least one visual sensor. The visual sensor is an instrument that acquires image information of an external environment by using an optical element and an imaging apparatus. An image resolution is usually used to describe performance of the visual sensor. Precision of the visual sensor is related to both the resolution and a detection distance between the visual sensor and a measured object. A farther distance between the visual sensor and the measured object indicates worse absolute precision. The visual sensor is a direct source of information for an unmanned aerial vehicle visual system. The visual sensor is mainly composed of one or two image sensors and sometimes needs to be equipped with a light projector and other auxiliary devices. The image sensor may use laser scanners, linear and planar array CCD cameras, TV cameras or digital cameras.

The unmanned aerial vehicle body 10 includes a fuselage. The visual sensor includes binocular sensors. The binocular sensors are 6 in number, and are respectively arranged on the top, bottom, left, right, front and rear of the fuselage.

In this embodiment, the at least one visual sensor includes a top-view binocular sensor 11a, a bottom-view binocular sensor 11b, a front-view binocular sensor 11c, a rear-view binocular sensor 11d, a left-view binocular sensor 11e and a right-view binocular sensor 11f. Specifically, the top-view binocular sensor 11a is arranged on the top of a housing of the fuselage and is configured to acquire an image above the unmanned aerial vehicle 100 during flight of the unmanned aerial vehicle 100. The bottom-view binocular sensor 11b is arranged on the bottom of the housing of the fuselage and is configured to acquire an image below the unmanned aerial vehicle 100 during flight of the unmanned aerial vehicle 100. The front-view binocular sensor 11c is arranged on a front side of the housing of the fuselage and is configured to acquire an image in front of the unmanned aerial vehicle 100 during flight of the unmanned aerial vehicle 100. The rear-view binocular sensor 11d is arranged on a rear side of the housing of the fuselage and is configured to acquire an image behind the unmanned aerial vehicle 100 during flight of the unmanned aerial vehicle 100. The left-view binocular sensor 11e is arranged on a left side of the housing of the fuselage and is configured to acquire an image on the left side of the unmanned aerial vehicle 100 during flight of the unmanned aerial vehicle 100. The right-view binocular sensor 11f is arranged on a right side of the housing of the fuselage and is configured to acquire an image on the right side of the unmanned aerial vehicle 100 during flight of the unmanned aerial vehicle 100.

The top-view binocular sensor 11a, the bottom-view binocular sensor 11b, the front-view binocular sensor 11c, the rear-view binocular sensor 11d, the left-view binocular sensor 11e and the right-view binocular sensor 11f send the acquired images to a visual trajectory module of the unmanned aerial vehicle 100 for processing. In this way, adoption of a multi-channel binocular structure reduces requirements for the definition and resolution of the binocular sensor.

In some embodiments, the unmanned aerial vehicle body 10 further includes arms connected to the fuselage, power systems arranged on the arms and a control system arranged on the fuselage. The power system is configured to provide a thrust, a lift force and the like for the unmanned aerial vehicle 100 to fly. The control system is a central nerve of the unmanned aerial vehicle 100 and may include a plurality of functional units, for example, a flight control system, a tracking system, a path planning system, a visual system and another system having a specific function. The systems may be arranged separately. In some embodiments, some or all of the systems may be alternatively integrated in one or more apparatuses.

In some embodiments, the unmanned aerial vehicle 100 tracks the to-be-tracked target according to a target feature. Some application scenarios of the unmanned aerial vehicle 100 further include an electronic device 200. The target feature may be sent to the unmanned aerial vehicle 100 by using the electronic device 200. Specifically, the electronic device 200 may display a picture captured by the unmanned aerial vehicle 100 and a user frames a target in the picture. After a target picture framed by the user is uploaded to the unmanned aerial vehicle 100, the unmanned aerial vehicle 100 may extract a target feature according to the framed target picture. A communication connection may be established between the unmanned aerial vehicle 100 and the electronic device 200 by using wireless communication modules (for example, a signal receiver and a signal transmitter) configured in the unmanned aerial vehicle and the electronic device respectively for uploading or delivering data/instructions. The electronic device 200 is, for example, a smartphone, a tablet computer, a computer or a remote controller.

FIG. 3 is a flowchart of a trajectory tracking method according to an embodiment of the present invention. The method may be performed by the unmanned aerial vehicle 100 shown in FIG. 1. As shown in FIG. 3, the method S500 includes the following steps:

S51: Obtain a flight image acquired by the at least one visual sensor, the flight image including a to-be-tracked target.

S52: Perform visual image processing on the flight image, to generate a gimbal rotation instruction and a path instruction.

A visual trajectory planning module of the unmanned aerial vehicle acquires 6 channels of image information sent by the top-view binocular sensor 11a, the bottom-view binocular sensor 11b, the front-view binocular sensor 11c, the rear-view binocular sensor 11d, the left-view binocular sensor 11e and the right-view binocular sensor 11f, establishes a real-time environment map according to the 6 channels of image information, and searches the environment map for a feasible path, to generate the gimbal rotation instruction and the path instruction.

The gimbal rotation instruction includes a yaw angle instruction, a pitch angle instruction, a yaw angle rotational velocity instruction and a pitch angle rotational velocity instruction; and the gimbal state parameter includes a gimbal attitude angle and a rotational angular rate. The path instruction includes a position instruction, a velocity instruction, an acceleration instruction, a jerk instruction, the yaw angle rotational velocity instruction and the yaw angle instruction; and the flight state parameter includes a position, a velocity, a heading angle, an unmanned aerial vehicle attitude angle and an angular velocity.

A yaw angle is an included angle between a projection of a vehicle body axis xt of the unmanned aerial vehicle on a horizontal plane and a ground axis xd, which may be measured by using a measurement-type sensor such as a gyroscope. A pitch angle is an included angle between an x-axis of a vehicle body coordinate system of the unmanned aerial vehicle and the horizontal plane. When the x-axis of the vehicle body coordinate system is above an XOY plane of an inertial coordinate system, the pitch angle is positive, or otherwise, the pitch angle is negative. The yaw angle, the pitch angle and a roll angle may be used for describing an attitude of an aircraft such as the unmanned aerial vehicle. A yaw angle rotational velocity is also referred to as a yaw angular velocity, a direction angular velocity or a yaw angular rate, which is an angular velocity of the unmanned aerial vehicle rotating around a vertical axis of the coordinate system. The yaw angle rotational velocity is positive when the unmanned aerial vehicle deflects to the left, and the yaw angle rotational velocity is negative when the unmanned aerial vehicle deflects to the right. A pitch angle rotational velocity is also referred to as a pitch angular velocity or a pitch angular rate, which is an angular velocity of the unmanned aerial vehicle rotating around a y-axis of the coordinate system. The gimbal attitude angle is determined according to a relationship between a gimbal coordinate system and a geographical coordinate system, which is represented by using three Euler angles, namely, a gimbal yaw angle, a gimbal pitch angle and a gimbal roll angle. Different rotation orders of the three angles may form different coordinate transform matrices. Spatial rotation of the gimbal coordinate system relative to the geographical coordinate system is usually represented by using orders of the gimbal yaw angle, the gimbal pitch angle and the gimbal roll angle. The rotational angular rate represents a speed of the gimbal rotating around a center point.

S53: Adjust an angle of the gimbal according to the gimbal rotation instruction and a gimbal state parameter of the gimbal, to lock the to-be-tracked target.

It is to be noted that, the step of adjusting an angle of the gimbal according to the gimbal rotation instruction and a gimbal state parameter of the gimbal is performed in a gimbal control system of the unmanned aerial vehicle. The gimbal control system includes a first attitude controller, a first instruction converter and a first angular rate tracker. All the first attitude controller, the first instruction converter and the first angular rate tracker may be implemented by hardware or software, or may be implemented by a combination of hardware or software.

Figure 4:
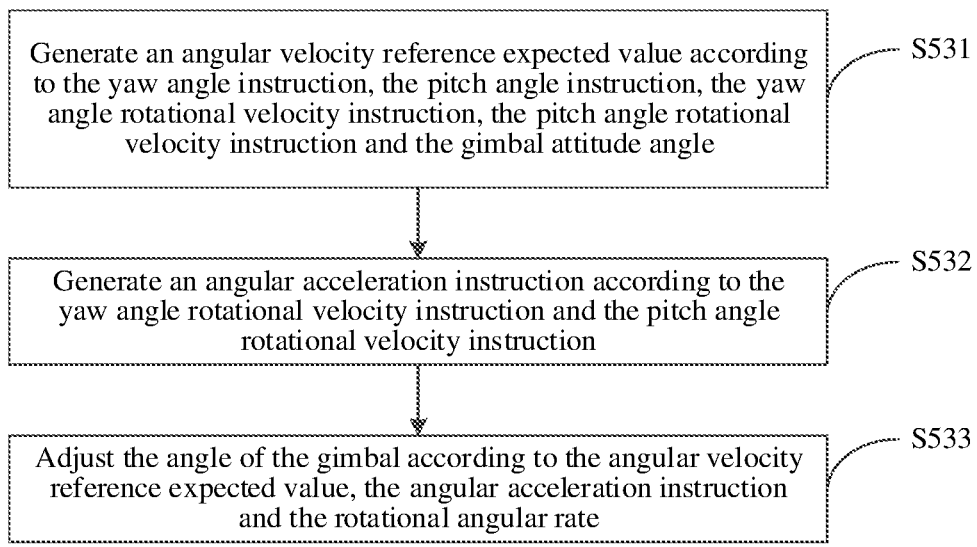
FIG. 4 is a method flowchart of step S53 shown in FIG. 3.

As shown in FIG. 4, the adjusting an angle of the gimbal according to the gimbal rotation instruction and a gimbal state parameter of the gimbal includes:

S531: Generate an angular velocity reference expected value according to the yaw angle instruction, the pitch angle instruction, the yaw angle rotational velocity instruction, the pitch angle rotational velocity instruction and the gimbal attitude angle.

Assuming that the yaw angle instruction is $\psi_c$, the pitch angle instruction is $\theta_c$, the yaw angle rotational velocity instruction is $\dot{\psi}_c$, the pitch angle rotational velocity instruction is $\dot{\theta}_c$, the gimbal attitude angle is $\phi_g$, $\theta_g$, $\omega_g$, and the rotational angular rate is $\omega_{xg}$, $\omega_{yg}$, $\omega_{zg}$, step S531 further includes: obtaining, by using the first attitude controller, a yaw angle instruction $\psi_c$, a pitch angle instruction $\theta_c$, a yaw angle rotational velocity instruction $\dot{\psi}_c$, a pitch angle rotational velocity instruction $\dot{\theta}_c$ and a gimbal attitude angle $\phi_g$, $\theta_g$, $\psi_g$, and generating an angular velocity reference expected value $$\begin{bmatrix} \omega_{xgr} \\ \omega_{ygr} \\ \omega_{zgr} \end{bmatrix}$$

according to the yaw angle instruction $\psi_c$, the pitch angle instruction $\theta_c$, the yaw angle rotational velocity instruction $\dot{\psi}_c$, the pitch angle rotational velocity instruction $\dot{\theta}_c$ and the gimbal attitude angle $\phi_g$, $\theta_g$, $\psi_g$. An expression of the angular velocity reference expected value is as follows:

$$\begin{bmatrix} \omega_{xgr} \\ \omega_{ygr} \\ \omega_{zgr} \end{bmatrix} = G_O^B \begin{bmatrix} 0 \\ \dot{\theta}_c \\ \dot{\psi}_c \end{bmatrix} + \begin{bmatrix} -\phi_g \\ \theta_C - \theta_g \\ \psi_C - \psi_g \end{bmatrix} \quad \text{Formula (1)}$$

where $$G_O^B = \begin{bmatrix} 1 & 0 & 0 \\ 0 & \cos\phi_g & \sin\phi_g \\ 0 & -\sin\phi_g & \cos\phi_g \end{bmatrix} \begin{bmatrix} \cos\theta_g & 0 & -\sin\theta_g \\ 0 & 1 & 0 \\ \sin\theta_g & 0 & \cos\theta_g \end{bmatrix} \quad \text{Formula (2)}$$

$$\begin{bmatrix} \cos\psi_g & \sin\psi_g & 0 \\ -\sin\psi_g & \cos\psi_g & 0 \\ 0 & 0 & 1 \end{bmatrix}$$

S532: Generate an angular acceleration instruction according to the yaw angle rotational velocity instruction and the pitch angle rotational velocity instruction.

In this embodiment, a yaw angle rotational velocity instruction $\dot{\psi}_c$ and a pitch angle rotational velocity instruction $\dot{\theta}_c$ are obtained by using the first instruction converter, and an angular acceleration instruction $$\begin{bmatrix} \dot{\omega}_{ygc} \\ \dot{\omega}_{zgc} \end{bmatrix}$$

is generated according to the yaw angle rotational velocity instruction $\dot{\psi}_c$ and the pitch angle rotational velocity instruction $\dot{\theta}_c$. An expression of the angular acceleration instruction is as follows:

$$\begin{bmatrix} \dot{\omega}_{ygc} \\ \dot{\omega}_{zgc} \end{bmatrix} = \frac{1}{\tau_g} \begin{bmatrix} \dot{\theta}_c - \omega_{ygc} \\ \dot{\psi}_c - \omega_{zgc} \end{bmatrix} \quad \text{Formula (3)}$$

where $\tau_g$ is an adjustable parameter.

S533: Adjust the angle of the gimbal according to the angular velocity reference expected value, the angular acceleration instruction and the rotational angular rate.

Figure 5:
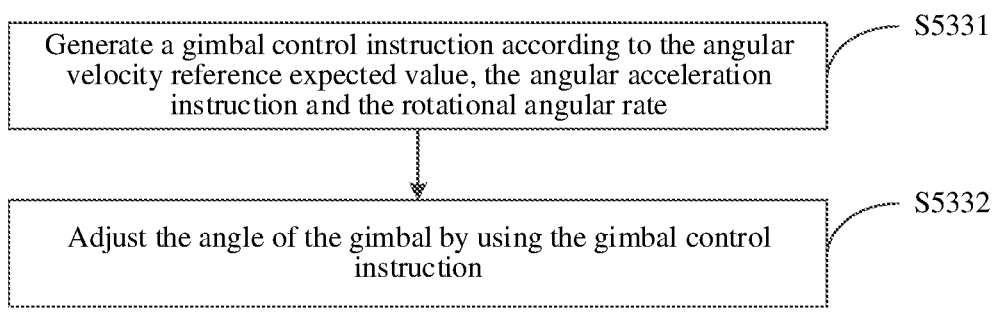
FIG. 5 is a method flowchart of step S533 shown in FIG. 4.

As shown in FIG. 5, the adjusting the angle of the gimbal according to the angular velocity reference expected value, the angular acceleration instruction and the rotational angular rate includes:

S5331: Generate a gimbal control instruction according to the angular velocity reference expected value, the angular acceleration instruction and the rotational angular rate.

S5332: Adjust the angle of the gimbal by using the gimbal control instruction.

Specifically, an angular velocity reference expected value $$\begin{bmatrix} \omega_{xgr} \\ \omega_{ygr} \\ \omega_{zgr} \end{bmatrix},$$

an angular acceleration instruction $$\begin{bmatrix} \dot{\omega}_{ygc} \\ \dot{\omega}_{zgc} \end{bmatrix}$$

and a rotational angular rate $\omega_{xg}$, $\omega_{yg}$, $\omega_{zg}$ are obtained by using the first angular rate tracker, and a gimbal control instruction is generated according to the angular velocity reference expected value $$\begin{bmatrix} \omega_{xgr} \\ \omega_{ygr} \\ \omega_{zgr} \end{bmatrix},$$

the angular acceleration instruction $$\begin{bmatrix} \dot{\omega}_{ygc} \\ \dot{\omega}_{zgc} \end{bmatrix}$$

and the rotational angular rate $\omega_{xg}$, $\omega_{yg}$, $\omega_{zg}$. An expression of the gimbal control instruction is as follows:

$$\begin{bmatrix} pwm_1^g \\ pwm_2^g \\ pwm_3^g \end{bmatrix} = K_{pwm}^g \left( \begin{bmatrix} 0 \\ \dot{\omega}_{ygc} \\ \dot{\omega}_{zgc} \end{bmatrix} + K_w^g \begin{bmatrix} \omega_{xgr} - \omega_{xg} \\ \omega_{ygr} - \omega_{yg} \\ \omega_{zgr} - \omega_{zg} \end{bmatrix} \right) \quad \text{Formula (4)}$$

where $K_{pwm}^g$ and $K_w^g$ are adjustable parameters.

In this embodiment, the gimbal control instruction is a motor PWM instruction of a gimbal motor. Rotation of the gimbal motor is controlled by using the motor PWM instruction of the gimbal motor, to adjust the gimbal to a corresponding angle and precisely lock the to-be-tracked target.

S54: Control a motor speed of a flight motor of the unmanned aerial vehicle according to the path instruction and a flight state parameter of the unmanned aerial vehicle, to cause the unmanned aerial vehicle to track the to-be-tracked target according to the path instruction.

It is to be noted that, the step of controlling a motor speed of a flight motor of the unmanned aerial vehicle according to the path instruction and a flight state parameter of the unmanned aerial vehicle is performed by a flight control system of the unmanned aerial vehicle. The flight control system includes a position tracker, a speed regulator, a second instruction converter, a third instruction converter, a second attitude controller, a second angular rate tracker and an instruction fusion device. All the position tracker, the speed regulator, the second instruction converter, the third instruction converter, the second attitude controller, the second angular rate tracker and the instruction fusion device may be implemented by hardware or software, or may be implemented by a combination of hardware or software.

Figure 6:
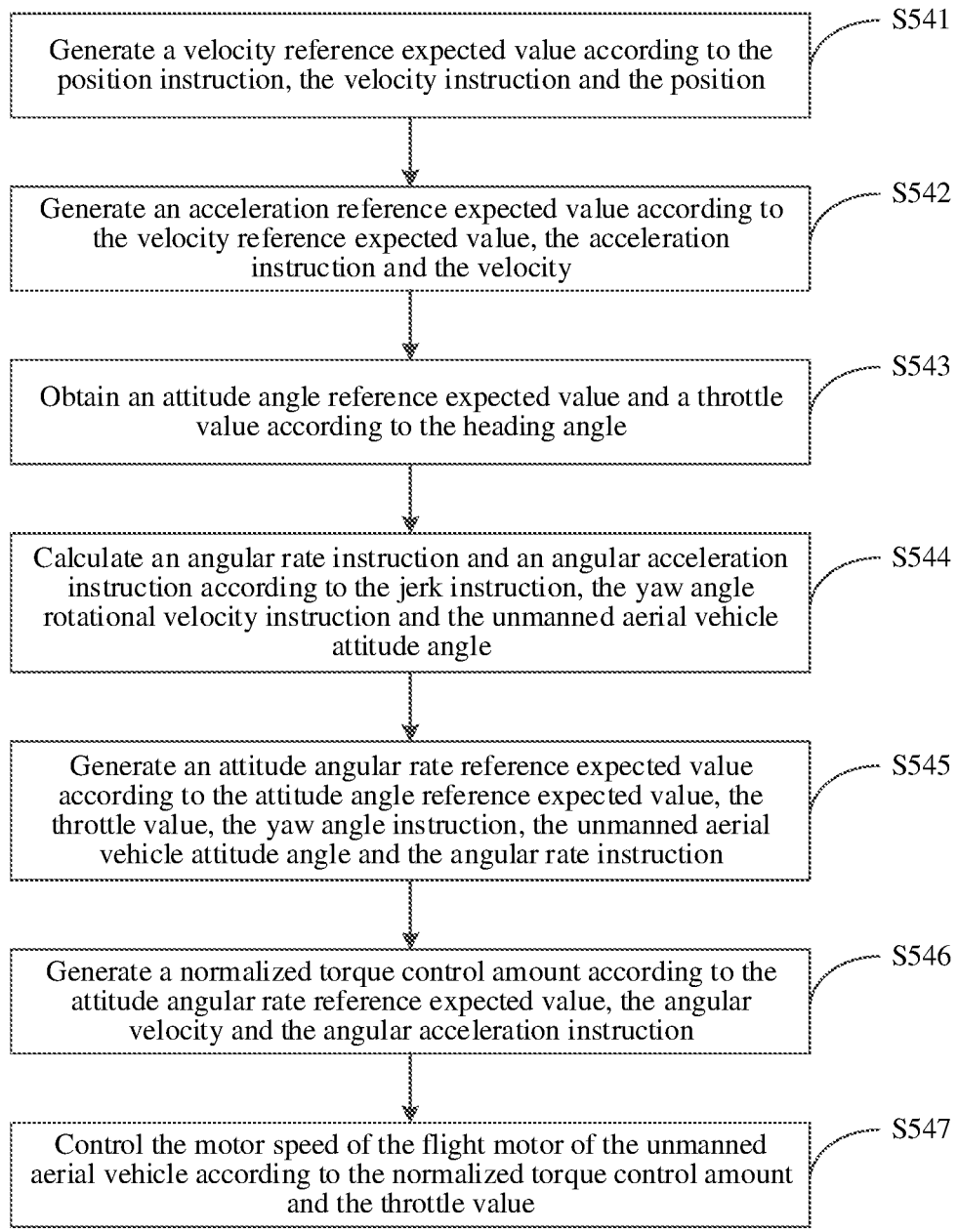
FIG. 6 is a method flowchart of step S54 shown in FIG. 3.

As shown in FIG. 6, the controlling a motor speed of a flight motor of the unmanned aerial vehicle according to the path instruction and a flight state parameter of the unmanned aerial vehicle includes:

S541: Generate a velocity reference expected value according to the position instruction, the velocity instruction and the position.

Assuming that the position instruction is $x_c$, $y_c$, $z_c$, the velocity instruction is $V_{xc}$, $V_{yc}$, $V_{zc}$, the acceleration instruction is $a_c$, $a_c$, $a_c$, the jerk instruction is $j_{xc}$, $j_{yc}$, $j_{zc}$, the position is x, Y, z, the velocity is $V_x$, $V_y$, $V_z$, the unmanned aerial vehicle attitude angle is $\phi$, $\theta$, $\psi$, the angular velocity is $\omega_x$, $\omega_y$, $\omega_z$, and the unmanned aerial vehicle attitude angle $\phi$, $\theta$, $\psi$ includes a roll angle, a pitch angle and a yaw angle, step S541 further includes: obtaining, by using the position tracker, a position instruction $x_c$, $y_c$, $z_c$, a velocity instruction $V_{xc}$, $V_{yc}$, $V_{zc}$ and a position x, y, z in the flight state parameter, and generating a velocity reference expected value $V_{xr}$, $V_{yr}$, $V_{zr}$ according to the position instruction $x_c$, $y_c$, $z_c$, the velocity instruction $V_{xc}$, $V_{yc}$, $V_{zc}$ and the position x, y, z in the flight state parameter. An expression of the velocity reference expected value is as follows:

$$\begin{bmatrix} V_{xr} \\ V_{yr} \\ V_{zr} \end{bmatrix} = \begin{bmatrix} V_{xc} \\ V_{yc} \\ V_{zc} \end{bmatrix} + K_p \begin{bmatrix} X_c - x \\ Y_c - y \\ Z_c - z \end{bmatrix} \quad \text{Formula (5)}$$

where $K_p$ is an adjustable parameter.

S542: Generate an acceleration reference expected value according to the velocity reference expected value, the acceleration instruction and the velocity.

In this embodiment, a velocity reference expected value $V_{xr}$, $V_{yr}$, $V_{zr}$, an acceleration instruction $a_c$, $a_c$, $a_c$ and a velocity $V_x$, $V_y$, $V_z$ are obtained by using the speed regulator, and an acceleration reference expected value $a_{xr}$, $a_{yr}$, $a_{zr}$ is generated according to the velocity reference expected value $V_{xr}$, $V_{yr}$, $V_{zr}$, the acceleration instruction $a_c$, $a_c$, $a_c$ and the velocity $V_x$, $V_y$, $V_z$. An expression of the acceleration reference expected value is as follows:

$$\begin{bmatrix} a_{xr} \\ a_{yr} \\ a_{zr} \end{bmatrix} = \begin{bmatrix} a_{xc} \\ a_{yc} \\ a_{zc} \end{bmatrix} + K_v \begin{bmatrix} V_{xr} - V_x \\ V_{yr} - V_y \\ V_{zr} - V_z \end{bmatrix} \quad \text{Formula (6)}$$

where $K_v$ is an adjustable parameter.

Figure 7:
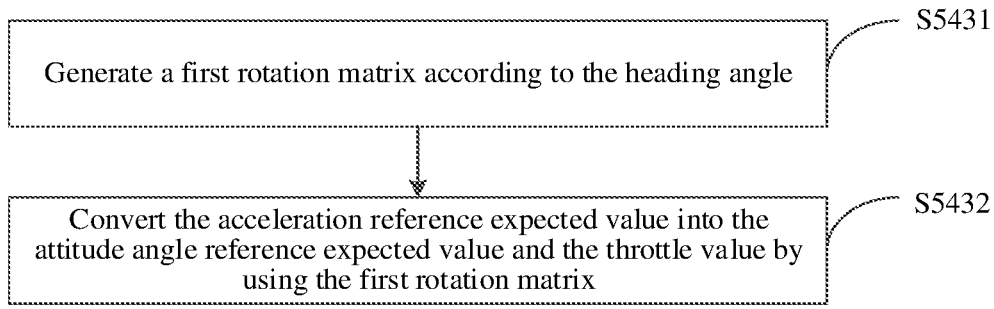
FIG. 7 is a method flowchart of step S543 shown in FIG. 6.

S543: Obtain an attitude angle reference expected value and a throttle value according to the heading angle. As shown in FIG. 7, the obtaining an attitude angle reference expected value and a throttle value according to the heading angle includes:

S5431: Generate a first rotation matrix according to the heading angle.

S5432: Convert the acceleration reference expected value into the attitude angle reference expected value and the throttle value by using the first rotation matrix.

Specifically, a heading angle is obtained by using the second instruction converter, a first rotation matrix $C_O^G$ is generated according to the heading angle, an acceleration reference expected value $a_{xr}$, $a_{yr}$, $a_{zr}$, and the acceleration reference expected value $a_{xr}$, $a_{yr}$, $a_{zr}$ is converted by using the first rotation matrix $C_O^G$, to obtain an attitude angle reference expected value $\phi_r$, $\theta_r$ and a throttle value T. Expressions are as follows:

$$C_O^G = \begin{bmatrix} \cos\psi & \sin\psi & 0 \\ -\sin\psi & \cos\psi & 0 \\ 0 & 0 & 1 \end{bmatrix} \quad \text{Formula (7)}$$

$$\begin{bmatrix} \theta_r \\ \phi_r \\ T \end{bmatrix} = \begin{bmatrix} -a\tan\dfrac{a_{xrG}}{g} \\ a\tan\dfrac{a_{xrG}\sqrt{a_{xrG}^2+g^2}}{g^2} \\ \dfrac{a_{zrG}/(\cos\theta_r+\cos\phi_r)+g}{a_{max}} \end{bmatrix} \quad \text{Formula (8)}$$

where $$\begin{bmatrix} a_{xrG} \\ a_{xrG} \\ a_{zrG} \end{bmatrix} = C_O^G \begin{bmatrix} a_{xr} \\ a_{xr} \\ a_{zr} \end{bmatrix} \quad \text{Formula (9)}$$

where g is gravity acceleration, and $a_{max}$ is a maximum thrust-to-weight ratio of the unmanned aerial vehicle. The thrust-to-weight ratio is an important technical performance index of an aircraft and an aircraft engine, which is a ratio of a thrust of the aircraft engine to gravity of the engine or gravity of the aircraft and represents a thrust produced by the aircraft engine or the aircraft per unit of gravity.

S544: Calculate an angular rate instruction and an angular acceleration instruction according to the jerk instruction, the yaw angle rotational velocity instruction and the unmanned aerial vehicle attitude angle.

Figure 8:
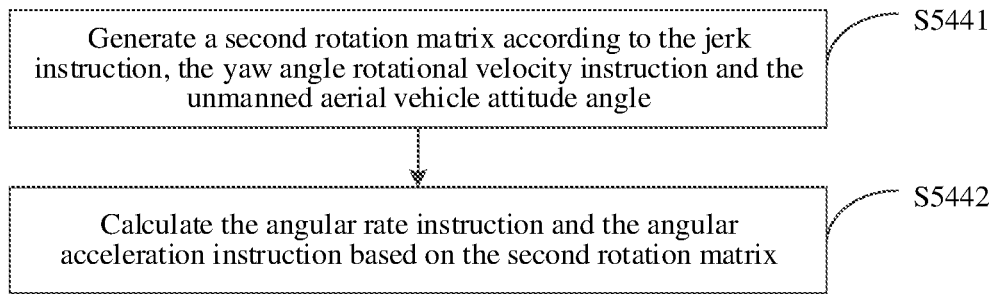
FIG. 8 is a method flowchart of step S544 shown in FIG. 6.

As shown in FIG. 8, the calculating an angular rate instruction and an angular acceleration instruction according to the jerk instruction, the yaw angle rotational velocity instruction and the unmanned aerial vehicle attitude angle includes:

S5441: Generate a second rotation matrix according to the jerk instruction, the yaw angle rotational velocity instruction and the unmanned aerial vehicle attitude angle.

S5442: Calculate the angular rate instruction and the angular acceleration instruction based on the second rotation matrix.

Specifically, a jerk instruction $j_{xc}$, $j_{yc}$, $j_{zc}$, a yaw angle rotational velocity instruction $\dot{\psi}_c$ and an unmanned aerial vehicle attitude angle $\phi$, $\theta$, $\psi$ are obtained by using the third instruction converter, a second rotation matrix $C_O^B$ is generated according to the jerk instruction $j_{xc}$, $j_{yc}$, $j_{zc}$, the yaw angle rotational velocity instruction $\dot{\psi}_c$ and the unmanned aerial vehicle attitude angle $\phi$, $\theta$, $\psi$, and an angular rate instruction $$\begin{bmatrix} \omega_{xc} \\ \omega_{yc} \\ \omega_{zc} \end{bmatrix}$$

and an angular acceleration instruction $$\begin{bmatrix} \dot{\omega}_{xm} \\ \dot{\omega}_{ym} \\ \dot{\omega}_{zm} \end{bmatrix}$$

are calculated based on the second rotation matrix $C_O^B$. Expressions of the angular rate instruction and the angular acceleration instruction are as follows:

$$\begin{bmatrix} \omega_{xc} \\ \omega_{yc} \\ \omega_{zc} \end{bmatrix} = \begin{bmatrix} -a\tan\dfrac{j_{xrB}}{g} \\ a\tan\dfrac{j_{xrB}}{g\cos\theta} \\ \dot{\psi}_c\cos\theta\cos\phi \end{bmatrix} \quad \text{Formula (10)}$$

$$\begin{bmatrix} \dot{\omega}_{xm} \\ \dot{\omega}_{ym} \\ \dot{\omega}_{zm} \end{bmatrix} = \dfrac{1}{\tau}\begin{bmatrix} \omega_{xc}-\omega_{xm} \\ \omega_{yc}-\omega_{ym} \\ \omega_{zc}-\omega_{zm} \end{bmatrix} \quad \text{Formula (11)}$$

where $$\begin{bmatrix} j_{xcB} \\ j_{ycB} \\ j_{zcB} \end{bmatrix} = C_O^B \begin{bmatrix} j_{xc} \\ j_{yc} \\ j_{zc} \end{bmatrix} \quad \text{Formula (12)}$$

where τ is an adjustable parameter.

S545: Generate an attitude angular rate reference expected value according to the attitude angle reference expected value, the throttle value, the yaw angle instruction, the unmanned aerial vehicle attitude angle and the angular rate instruction.

In this embodiment, an attitude angle reference expected value $\phi_r$, $\theta_r$, a throttle value T, a yaw angle instruction $\psi_c$, an unmanned aerial vehicle attitude angle $\phi$, $\theta$, $\psi$ and angular rate instruction $$\begin{bmatrix} \omega_{xc} \\ \omega_{yc} \\ \omega_{zc} \end{bmatrix}$$

are obtained by using the second attitude controller, and an attitude angular rate reference expected value $$\begin{bmatrix} \omega_{xr} \\ \omega_{yr} \\ \omega_{zr} \end{bmatrix}$$

is generated according to the attitude angle reference expected value $\phi_r$, $\theta_r$, the throttle value T, the yaw angle instruction $\psi_c$, the unmanned aerial vehicle attitude angle $\phi$, $\theta$, $\psi$ and the angular rate instruction $$\begin{bmatrix} \omega_{xc} \\ \omega_{yc} \\ \omega_{zc} \end{bmatrix}.$$

An expression of the attitude angular rate reference expected value is as follows:

$$\begin{bmatrix} \omega_{xr} \\ \omega_{yr} \\ \omega_{zr} \end{bmatrix} = \begin{bmatrix} \omega_{xc} \\ \omega_{yc} \\ \omega_{zc} \end{bmatrix} + C_G^B K_A \begin{bmatrix} \phi_r - \phi \\ \theta_r - \theta \\ \psi_r - \psi \end{bmatrix} \quad \text{Formula (13)}$$

where $$C_G^B = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \quad \text{Formula (14)}$$

where $K_A$ is an adjustable parameter.

S546: Generate a normalized torque control amount according to the attitude angular rate reference expected value, the angular velocity and the angular acceleration instruction.

In this embodiment, an attitude angular rate reference expected value $$\begin{bmatrix} \omega_{xr} \\ \omega_{yr} \\ \omega_{zr} \end{bmatrix},$$

an angular velocity $\omega_x$, $\omega_y$, $\omega_z$ and angular acceleration instruction $$\begin{bmatrix} \dot\omega_{xm} \\ \dot\omega_{ym} \\ \dot\omega_{zm} \end{bmatrix}$$

are obtained by using the angular rate tracker, and a normalized torque control amount $$\begin{bmatrix} m_x \\ m_y \\ m_z \end{bmatrix}$$

is generated according to the attitude angular rate reference expected value $$\begin{bmatrix} \omega_{xr} \\ \omega_{yr} \\ \omega_{zr} \end{bmatrix},$$

the angular velocity $\omega_x$, $\omega_y$, $\omega_z$ and the angular acceleration instruction. An expression of the normalized torque control amount is as follows:

$$\begin{bmatrix} m_x \\ m_y \\ m_z \end{bmatrix} = sat\left\{ B^{-1} \left( \begin{bmatrix} \dot\omega_{xm} \\ \dot\omega_{ym} \\ \dot\omega_{zm} \end{bmatrix} + K_w \begin{bmatrix} \omega_{xr} - \omega_x \\ \omega_{yr} - \omega_y \\ \omega_{zr} - \omega_z \end{bmatrix} \right) \right\}_{-1}^{1} \quad \text{Formula (15)}$$

where $K_w$ is an adjustable parameter, B is an efficiency parameter of the unmanned aerial vehicle. For different unmanned aerial vehicles, B is different.

S547: Control the motor speed of the flight motor of the unmanned aerial vehicle according to the normalized torque control amount and the throttle value.

Figure 9:
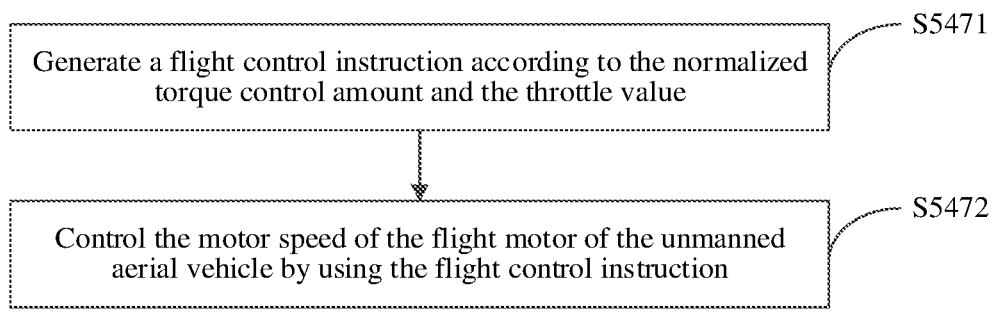
FIG. 9 is a method flowchart of step S547 shown in FIG. 6.

As shown in FIG. 9, the controlling the motor speed of the flight motor of the unmanned aerial vehicle according to the normalized torque control amount and the throttle value includes:

S5471: Generate a flight control instruction according to the normalized torque control amount and the throttle value.

S5472: Control the motor speed of the flight motor of the unmanned aerial vehicle by using the flight control instruction.

Specifically, a normalized torque control amount $$\begin{bmatrix} m_x \\ m_y \\ m_z \end{bmatrix}$$

and a throttle value T are obtained by using the instruction fusion device, a flight control instruction is generated according to the normalized torque control amount $$\begin{bmatrix} m_x \\ m_y \\ m_z \end{bmatrix}$$

and the throttle value T, and the motor speed of the flight motor of the unmanned aerial vehicle is controlled by using the flight control instruction. An expression of the flight control instruction is as follows:

$$\begin{bmatrix} pwm_1 \\ pwm_2 \\ pwm_3 \end{bmatrix} = KpwmM^{-1}\begin{bmatrix} m_x \\ m_y \\ m_z \end{bmatrix} + pwm_{base}\begin{bmatrix} 1 \\ 1 \\ \dots \\ 1 \end{bmatrix} \quad \text{Formula (16)}$$

where M is an allocation matrix and is related to the unmanned aerial vehicle. For unmanned aerial vehicles of different types, M is different. Kpwm is pwm gain and is determined by an electronic speed regulator of the unmanned aerial vehicle. $pwm_{base}$ is basic pwm and is determined by the electronic speed regulator of the unmanned aerial vehicle.

In this embodiment, the flight control instruction is a motor PWM instruction of the flight motor. The motor speed of the flight motor of the unmanned aerial vehicle is controlled by using the motor PWM instruction of the flight motor. In this way, the unmanned aerial vehicle tracks a to-be-tracked target according to a path instruction generated based on flight images acquired by a multi-channel binocular sensor. Therefore, in the embodiments of the present invention, a gimbal rotation instruction and a path instruction are generated based on the flight images acquired by the multi-channel binocular sensor, the angle of the gimbal is adjusted according to the gimbal rotation instruction and a gimbal state parameter to lock the to-be-tracked target, and the motor speed of the flight motor of the unmanned aerial vehicle is controlled according to the path instruction and a flight state parameter, so that the unmanned aerial vehicle tracks the to-be-tracked target according to the path instruction, thereby reducing update frequency of path planning performed by the unmanned aerial vehicle, and further reducing processing pressure of a processor chip.

According to a trajectory tracking method provided in this embodiment of the present invention, an angle of a gimbal is adjusted and a motor speed of a flight motor of an unmanned aerial vehicle is controlled according to a flight image acquired by at least one visual sensor in real time, a gimbal state parameter of the gimbal and a flight state parameter of the unmanned aerial vehicle. The foregoing adjustment process is repeated. In this way, the unmanned aerial vehicle precisely tracks the to-be-tracked target according to a trajectory obtained by processing the flight image. The tracking performance of the unmanned aerial vehicle may be improved through cooperation of the at least one visual sensor, the gimbal and the flight motor of the unmanned aerial vehicle.

Figure 10:
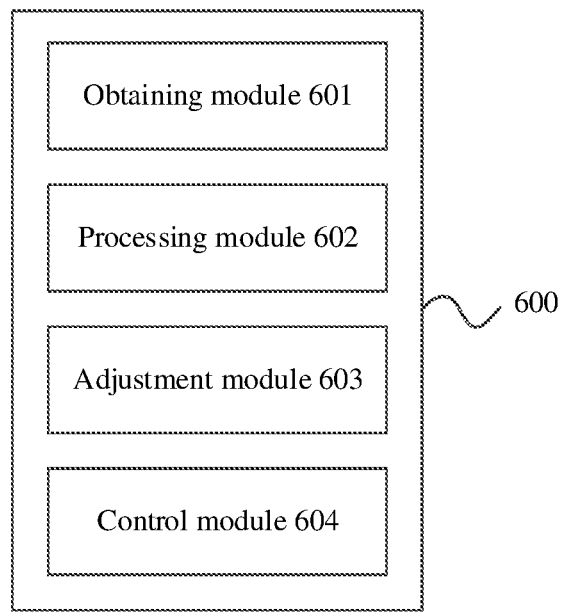
FIG. 10 is a schematic structural diagram of a trajectory tracking apparatus according to an embodiment of the present invention.

Correspondingly, as shown in FIG. 10, an embodiment of the present invention further provides a trajectory tracking apparatus. The apparatus is applicable to the unmanned aerial vehicle 100 shown in FIG. 1. The trajectory tracking apparatus 600 includes:

an obtaining module 601, configured to obtain a flight image acquired by the at least one visual sensor, the flight image including a to-be-tracked target;

a processing module 602, configured to perform visual image processing on the flight image, to generate a gimbal rotation instruction and a path instruction; an adjustment module 603, configured to adjust an angle of the gimbal according to the gimbal rotation instruction and a gimbal state parameter of the gimbal, to lock the to-be-tracked target; and a control module 604, configured to control a motor speed of a flight motor of the unmanned aerial vehicle according to the path instruction and a flight state parameter of the unmanned aerial vehicle, to cause the unmanned aerial vehicle to track the to-be-tracked target according to the path instruction.

The gimbal rotation instruction includes a yaw angle instruction, a pitch angle instruction, a yaw angle rotational velocity instruction and a pitch angle rotational velocity instruction; and the gimbal state parameter includes a gimbal attitude angle and a rotational angular rate. In some embodiments, the adjustment module 603 is further configured to:

generate an angular velocity reference expected value according to the yaw angle instruction, the pitch angle instruction, the yaw angle rotational velocity instruction, the pitch angle rotational velocity instruction and the gimbal attitude angle;

generate an angular acceleration instruction according to the yaw angle rotational velocity instruction and the pitch angle rotational velocity instruction; and adjust the angle of the gimbal according to the angular velocity reference expected value, the angular acceleration instruction and the rotational angular rate.

In some embodiments, the adjusting the angle of the gimbal according to the angular velocity reference expected value, the angular acceleration instruction and the rotational angular rate includes: generating a gimbal control instruction according to the angular velocity reference expected value, the angular acceleration instruction and the rotational angular rate; and adjusting the angle of the gimbal by using the gimbal control instruction.

The path instruction includes a position instruction, a velocity instruction, an acceleration instruction, a jerk instruction, the yaw angle rotational velocity instruction and the yaw angle instruction; and the flight state parameter includes a position, a velocity, a heading angle, an unmanned aerial vehicle attitude angle and an angular velocity.

In some embodiments, the control module 604 is further configured to:

generate a velocity reference expected value according to the position instruction, the velocity instruction and the position;

generate an acceleration reference expected value according to the velocity reference expected value, the acceleration instruction and the velocity;

obtain an attitude angle reference expected value and a throttle value according to the heading angle;

calculate an angular rate instruction and an angular acceleration instruction according to the jerk instruction, the yaw angle rotational velocity instruction and the unmanned aerial vehicle attitude angle;

generate an attitude angular rate reference expected value according to the attitude angle reference expected value, the throttle value, the yaw angle instruction, the unmanned aerial vehicle attitude angle and the angular rate instruction;

generate a normalized torque control amount according to the attitude angular rate reference expected value, the angular velocity and the angular acceleration instruction; and control the motor speed of the flight motor of the unmanned aerial vehicle according to the normalized torque control amount and the throttle value.

In some embodiments, the obtaining an attitude angle reference expected value and a throttle value according to the heading angle includes: generating a first rotation matrix according to the heading angle; and converting the acceleration reference expected value into the attitude angle reference expected value and the throttle value by using the first rotation matrix.

In some embodiments, the calculating an angular rate instruction and an angular acceleration instruction according to the jerk instruction, the yaw angle rotational velocity instruction and the unmanned aerial vehicle attitude angle includes: generating a second rotation matrix according to the jerk instruction, the yaw angle rotational velocity instruction and the unmanned aerial vehicle attitude angle; and calculating the angular rate instruction and the angular acceleration instruction based on the second rotation matrix.

In some embodiments, the controlling the motor speed of the flight motor of the unmanned aerial vehicle according to the normalized torque control amount and the throttle value includes: generating a flight control instruction according to the normalized torque control amount and the throttle value; and controlling the motor speed of the flight motor of the unmanned aerial vehicle by using the flight control instruction.

It is to be noted that, the foregoing apparatus may perform the method provided in the embodiments of the present application, and have the corresponding functional modules for performing the method and beneficial effects thereof. For technical details not described in detail in the apparatus embodiment, refer to the method provided in the embodiments of the present application.

Figure 11:
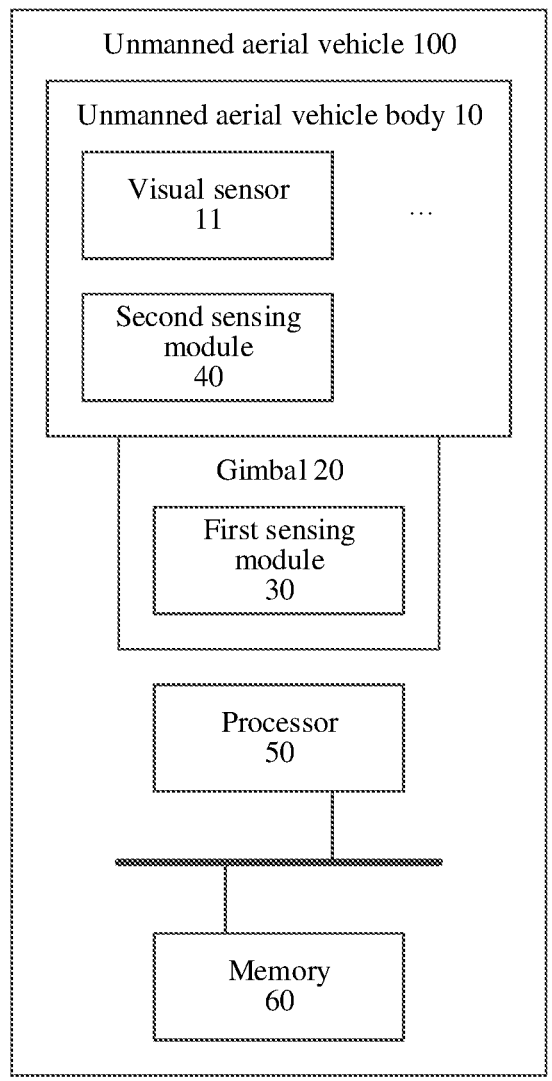
FIG. 11 is a schematic structural diagram of an unmanned aerial vehicle according to an embodiment of the present invention.

FIG. 11 is a schematic structural diagram of an unmanned aerial vehicle according to an embodiment of the present invention. As shown in FIG. 11, the unmanned aerial vehicle 100 is applicable to the application scenario shown in FIG. 1 and includes an unmanned aerial vehicle body 10, a gimbal 20, a first sensing module 30, a second sensing module 40, at least one processor 50 and a memory 60 communicatively connected to the at least one processor 50. In FIG. 11, one processor 50 is used as an example.

The unmanned aerial vehicle body 10 includes at least one visual sensor 11. The visual sensor 11 is configured to acquire a flight image of the unmanned aerial vehicle 100.

The flight image includes a to-be-tracked target. The gimbal 20 is mounted on the unmanned aerial vehicle body 10 and may be configured to mount and fix a camera device. The first sensing module 30 is arranged on the gimbal 20 and is configured to obtain a gimbal state parameter of the gimbal 20. The second sensing module 40 is arranged on the unmanned aerial vehicle body 10 and is configured to obtain a flight state parameter of the unmanned aerial vehicle 100. The memory 60 stores instructions executable by the at least one processor 50. The instructions are executed by the at least one processor 50, to cause the at least one processor 50 to perform the trajectory tracking method according to the foregoing method embodiments.

The processor 50 and the memory 60 may be connected through a bus or in other manners and are, for example, connected through a bus in FIG. 11.

The memory 60, as a non-volatile computer-readable storage medium, may be configured to store a non-volatile software program, a non-volatile computer-executable program and a module, for example, program instructions/modules corresponding to the trajectory tracking method in the embodiments of the present invention, for example, the modules shown in FIG. 10. The processor 50 performs various functional applications and data processing of a server by running the non-volatile software program, instructions and module stored in the memory 60, that is, implementing the trajectory tracking method described in the foregoing method embodiments.

The memory 60 may include a program storage area and a data storage area. The program storage area may store an operating system and an application program that is required for at least one function. The storage data area may store data and the like created according to use of the trajectory tracking apparatus. In addition, the memory 60 may include a high speed random access memory, and may also include a non-volatile memory, such as at least one magnetic disk storage device, a flash memory or another volatile solid-state storage device. In some embodiments, the memory 60 may optionally include memories remotely disposed relative to the processor 50, and the remote memories may be connected to the trajectory tracking apparatus through a network. Examples of the network include, but are not limited to, the Internet, an intranet, a local area network, a mobile communication network and a combination thereof.

The one or more modules are stored in the memory 60, and when executed by the one or more processors 50, perform the trajectory tracking method described in any of the foregoing method embodiments. For example, the method steps in FIG. 3 to FIG. 9 are performed, to implement the functions of the modules and units in FIG. 10.

For the foregoing unmanned aerial vehicle, the method provided in the embodiments of the present invention may be performed, and the corresponding functional modules for performing the method and beneficial effects thereof are provided. For technical details not described in detail in this embodiment, reference may be made to the method provided in the embodiments of the present invention.

An embodiment of the present invention further provides a non-volatile computer-readable storage medium, storing computer-executable instructions, the computer-executable instructions being executed by one or more processors and being used for enabling the unmanned aerial vehicle to perform the trajectory tracking method according to any embodiment.

An embodiment of the present invention further provides a computer program product, including a computer program stored in a non-volatile computer-readable storage medium, the computer program including program instructions, the program instructions, when executed by a computer, causing the computer to perform the trajectory tracking method described in any of the foregoing method embodiments. For example, the method steps in FIG. 3 to FIG. 9 are performed, to implement the functions of the modules and the units in FIG. 10.

It is to be noted that, the foregoing described apparatus embodiments are merely examples. The units described as separate parts may or may not be physically separate, and the parts displayed as units may or may not be physical units, may be located in one position, or may be distributed on a plurality of network units. Some or all of the modules may be selected according to actual requirements to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may be a magnetic disk, an optical disc, a read-only memory (ROM), a random access memory (RAM) or the like.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present invention.

What is claimed is:

1. A trajectory tracking method, applied to an unmanned aerial vehicle, the unmanned aerial vehicle comprising an unmanned aerial vehicle body and a gimbal, the gimbal being mounted on the unmanned aerial vehicle body, and the unmanned aerial vehicle body being equipped with at least one visual sensor, wherein the method comprises:
  obtaining a flight image acquired by the at least one visual sensor, the flight image comprising a to-be-tracked target;
  performing visual image processing on the flight image, to generate a gimbal rotation instruction and a path instruction;
  adjusting an angle of the gimbal according to the gimbal rotation instruction and a gimbal state parameter of the gimbal, to lock the to-be-tracked target; and
  controlling a motor speed of a flight motor of the unmanned aerial vehicle according to the path instruction and a flight state parameter of the unmanned aerial vehicle, to cause the unmanned aerial vehicle to track the to-be-tracked target according to the path instruction;

wherein the gimbal rotation instruction comprises a yaw angle instruction, a pitch angle instruction, a yaw angle rotational velocity instruction and a pitch angle rotational velocity instruction;

the gimbal state parameter comprises a gimbal attitude angle and a rotational angular rate;

the path instruction comprises a position instruction, a velocity instruction, an acceleration instruction, a jerk instruction, the yaw angle rotational velocity instruction and the yaw angle instruction;

the flight state parameter comprises a position, a velocity, a heading angle, an unmanned aerial vehicle attitude angle and an angular velocity;

the controlling a motor speed of a flight motor of the unmanned aerial vehicle according to the path instruction and a flight state parameter of the unmanned aerial vehicle comprises:

generating a velocity reference expected value according to the position instruction, the velocity instruction and the position;

generating an acceleration reference expected value according to the velocity reference expected value, the acceleration instruction and the velocity;

obtaining an attitude angle reference expected value and a throttle value according to the heading angle;

calculating an angular rate instruction and an angular acceleration instruction according to the jerk instruction, the yaw angle rotational velocity instruction and the unmanned aerial vehicle attitude angle;

generating an attitude angular rate reference expected value according to the attitude angle reference expected value, the throttle value, the yaw angle instruction, the unmanned aerial vehicle attitude angle and the angular rate instruction;

generating a normalized torque control amount according to the attitude angular rate reference expected value, the angular velocity and the angular acceleration instruction; and controlling the motor speed of the flight motor of the unmanned aerial vehicle according to the normalized torque control amount and the throttle value.

2. The method according to claim 1, wherein the unmanned aerial vehicle body comprises a fuselage, and the visual sensor comprises binocular sensors; and the binocular sensors are 6 in number, and are respectively arranged on the top, bottom, left, right, front and rear of the fuselage.

3. The method according to claim 1, wherein the adjusting an angle of the gimbal according to the gimbal rotation instruction and a gimbal state parameter of the gimbal comprises:

generating an angular velocity reference expected value according to the yaw angle instruction, the pitch angle instruction, the yaw angle rotational velocity instruction, the pitch angle rotational velocity instruction and the gimbal attitude angle;

generating an angular acceleration instruction according to the yaw angle rotational velocity instruction and the pitch angle rotational velocity instruction; and adjusting the angle of the gimbal according to the angular velocity reference expected value, the angular acceleration instruction and the rotational angular rate.

4. The method according to claim 3, wherein the adjusting the angle of the gimbal according to the angular velocity reference expected value, the angular acceleration instruction and the rotational angular rate comprises:

generating a gimbal control instruction according to the angular velocity reference expected value, the angular acceleration instruction and the rotational angular rate; and adjusting the angle of the gimbal by using the gimbal control instruction.

5. The method according to claim 1, wherein the obtaining an attitude angle reference expected value and a throttle value according to the heading angle comprises:

generating a first rotation matrix according to the heading angle; and converting the acceleration reference expected value into the attitude angle reference expected value and the throttle value by using the first rotation matrix.

6. The method according to claim 5, wherein the calculating an angular rate instruction and an angular acceleration instruction according to the jerk instruction, the yaw angle rotational velocity instruction and the unmanned aerial vehicle attitude angle comprises:

generating a second rotation matrix according to the jerk instruction, the yaw angle rotational velocity instruction and the unmanned aerial vehicle attitude angle; and calculating the angular rate instruction and the angular acceleration instruction based on the second rotation matrix.

7. The method according to claim 1, wherein the controlling the motor speed of the flight motor of the unmanned aerial vehicle according to the normalized torque control amount and the throttle value comprises:

generating a flight control instruction according to the normalized torque control amount and the throttle value; and controlling the motor speed of the flight motor of the unmanned aerial vehicle by using the flight control instruction.

8. An unmanned aerial vehicle, comprising:

an unmanned aerial vehicle body, being equipped with at least one visual sensor;

a gimbal, mounted on the unmanned aerial vehicle body;

a first sensing module, arranged on the gimbal and configured to obtain a gimbal state parameter of the gimbal;

a second sensing module, arranged on the unmanned aerial vehicle body and configured to obtain a flight state parameter of the unmanned aerial vehicle;

at least one processor; and a memory communicatively connected to the at least one processor, wherein the memory stores instructions executable by the at least one processor, and the instructions are executed by the at least one processor to cause the at least one processor to perform the following steps:

obtaining a flight image acquired by the at least one visual sensor, the flight image comprising a to-be-tracked target;

performing visual image processing on the flight image, to generate a gimbal rotation instruction and a path instruction;

adjusting an angle of the gimbal according to the gimbal rotation instruction and a gimbal state parameter of the gimbal, to lock the to-be-tracked target;

controlling a motor speed of a flight motor of the unmanned aerial vehicle according to the path instruction and a flight state parameter of the unmanned aerial vehicle, to cause the unmanned aerial vehicle to track the to-be-tracked target according to the path instruction wherein the gimbal rotation instruction comprises a yaw angle instruction, a pitch angle instruction, a yaw angle rotational velocity instruction and a pitch angle rotational velocity instruction;

the gimbal state parameter comprises a gimbal attitude angle and a rotational angular rate;

the path instruction comprises a position instruction, a velocity instruction, an acceleration instruction, a jerk instruction, the yaw angle rotational velocity instruction and the yaw angle instruction;

the flight state parameter comprises a position, a velocity, a heading angle, an unmanned aerial vehicle attitude angle and an angular velocity; and the at least one processor is further configured to:
generate a velocity reference expected value according to the position instruction, the velocity instruction and the position;

generate an acceleration reference expected value according to the velocity reference expected value, the acceleration instruction and the velocity;

obtain an attitude angle reference expected value and a throttle value according to the heading angle;

calculate an angular rate instruction and an angular acceleration instruction according to the jerk instruction, the yaw angle rotational velocity instruction and the unmanned aerial vehicle attitude angle;

generate an attitude angular rate reference expected value according to the attitude angle reference expected value, the throttle value, the yaw angle instruction, the unmanned aerial vehicle attitude angle and the angular rate instruction;

generate a normalized torque control amount according to the attitude angular rate reference expected value, the angular velocity and the angular acceleration instruction; and control the motor speed of the flight motor of the unmanned aerial vehicle according to the normalized torque control amount and the throttle value.

9. The unmanned aerial vehicle according to claim 8, wherein the unmanned aerial vehicle body comprises a fuselage, and the visual sensor comprises binocular sensors; and the binocular sensors are 6 in number, and are respectively arranged on the top, bottom, left, right, front and rear of the fuselage.

10. The unmanned aerial vehicle according to claim 8, wherein the at least one processor is further configured to:
generate an angular velocity reference expected value according to the yaw angle instruction, the pitch angle instruction, the yaw angle rotational velocity instruction, the pitch angle rotational velocity instruction and the gimbal attitude angle;

generate an angular acceleration instruction according to the yaw angle rotational velocity instruction and the pitch angle rotational velocity instruction; and adjust the angle of the gimbal according to the angular velocity reference expected value, the angular acceleration instruction and the rotational angular rate.

11. The unmanned aerial vehicle according to claim 10, wherein the at least one processor is further configured to:
generate a gimbal control instruction according to the angular velocity reference expected value, the angular acceleration instruction and the rotational angular rate; and adjust the angle of the gimbal by using the gimbal control instruction.

12. The unmanned aerial vehicle according to claim 8, wherein the at least one processor is further configured to:
generate a first rotation matrix according to the heading angle; and convert the acceleration reference expected value into the attitude angle reference expected value and the throttle value by using the first rotation matrix.

13. The unmanned aerial vehicle according to claim 12, wherein the at least one processor is further configured to:
generate a second rotation matrix according to the jerk instruction, the yaw angle rotational velocity instruction and the unmanned aerial vehicle attitude angle; and calculate the angular rate instruction and the angular acceleration instruction based on the second rotation matrix.

14. The unmanned aerial vehicle according to claim 8, wherein the at least one processor is further configured to:
generate a flight control instruction according to the normalized torque control amount and the throttle value; and control the motor speed of the flight motor of the unmanned aerial vehicle by using the flight control instruction.

* * * * *